United States Patent [19]
Kuzma

[11] Patent Number: 5,600,684
[45] Date of Patent: Feb. 4, 1997

[54] AUTOMATIC IDENTIFICATION FOR DIGITAL CONFERENCING

[76] Inventor: Andrew Kuzma, 12558 NW. Woodland Ct., Portland, Oreg. 97229

[21] Appl. No.: 305,206

[22] Filed: Sep. 13, 1994

[51] Int. Cl.⁶ .................................................. H04L 23/00
[52] U.S. Cl. ........................... 375/377; 370/264; 370/470
[58] Field of Search .............................. 375/377; 370/82, 370/99, 94.1, 79, 110.1

[56] References Cited

U.S. PATENT DOCUMENTS

| | | | |
|---|---|---|---|
| 4,979,169 | 12/1990 | Almond et al. | 370/99 |
| 5,056,084 | 10/1991 | Le Corre | 370/99 |
| 5,231,492 | 7/1993 | Dangi et al. | 358/143 |
| 5,331,672 | 7/1994 | Evans et al. | 375/377 |
| 5,497,396 | 3/1996 | Delprat | 375/377 |

OTHER PUBLICATIONS

Sparagins et al., "Telecommunications Pratocols and Design" 1991, pp. 323–324.

*Primary Examiner*—Stephen Chin
*Assistant Examiner*—Hai H. Phan
*Attorney, Agent, or Firm*—William H. Murray

[57] ABSTRACT

A framed format identification signal is imbedded with a flagged format identification signal so that two terminals connected to a digital transmission network can automatically determine whether they are compatible and choose their preferred format for full communication.

2 Claims, 20 Drawing Sheets

| iTone Bit Sequence | HDLC interpretation |
|---|---|
| first even frame FAS/BAS | noise (no flag) |
| iTone sequence | UI message containing iTone |
| even frame padding (if any) and odd frame FAS/BAS parity | bad message (CRC failure) |
| iTone sequence | UI message containing iTone |
| odd frame padding (if any) and second even frame FAS/BAS parity | bad message (CRC failure) |
| iTone sequence | UI message containing iTone |
| even frame padding (if any) and odd frame FAS/BAS parity | bad message (CRC failure) |
| iTone sequence | UI message containing iTone |
| odd frame padding (if any) | bad message waiting for flag framing |

|  | STATION ONE | | |
|---|---|---|---|
| CAPABILITY / STATION TWO | PCS | H.320 OR PCS | H.320 |
| PCS | PCS | PCS | X |
| H.320 OR PCS | PCS | PCS | H.320 |
| H.320 | X | H.320 | H.320 |

*FIG. 1*

| iTone Bit Sequence | HDLC interpretation |
|---|---|
| first even frame FAS/BAS | noise (no flag) |
| iTone sequence | UI message containing iTone |
| even frame padding (if any) and odd frame FAS/BAS parity | bad message (CRC failure) |
| iTone sequence | UI message containing iTone |
| odd frame padding (if any) and second even frame FAS/BAS parity | bad message (CRC failure) |
| iTone sequence | UI message containing iTone |
| even frame padding (if any) and odd frame FAS/BAS parity | bad message (CRC failure) |
| iTone sequence | UI message containing iTone |
| odd frame padding (if any) and third even frame FAS/BAS parity | bad message (CRC failure) |
| iTone sequence | UI message containing iTone |
| even frame padding (if any) and odd frame FAS/BAS parity | bad message (CRC failure) |
| iTone sequence | UI message containing iTone |
| odd frame padding (if any) and fourth even frame FAS/BAS parity | bad message (CRC failure) |
| iTone sequence | UI message containing iTone |
| even frame padding (if any) and odd frame FAS/BAS parity | bad message (CRC failure) |
| iTone sequence | UI message containing iTone |
| odd frame padding (if any) and fifth even frame FAS/BAS parity | bad message (CRC failure) |
| iTone sequence | UI message containing iTone |
| even frame padding (if any) and odd frame FAS/BAS parity | bad message (CRC failure) |
| iTone sequence | UI message containing iTone |
| odd frame padding (if any) | bad message (CRC failure) framing |

FIG. 2

| iTone Bit Sequence | HDLC interpretation |
|---|---|
| first even frame FAS/BAS | noise (no flag) |
| iTone sequence | UI message containing iTone |
| even frame padding (if any) and odd frame FAS/BAS parity | bad message (CRC failure) |
| iTone sequence | UI message containing iTone |
| odd frame padding (if any) and second even frame FAS/BAS parity | bad message (CRC failure) |
| iTone sequence | UI message containing iTone |
| even frame padding (if any) and odd frame FAS/BAS parity | bad message (CRC failure) |
| iTone sequence | UI message containing iTone |
| odd frame padding (if any) | bad message waiting for flag framing |

*FIG. 3*

Even Frame

| Octet | \multicolumn{8}{c}{Logical Channel or Bit Position} | |
|---|---|---|---|---|---|---|---|---|---|
| | 1 | 2 | 3 | 4 | 5 | 6 | 7 | 8 | |
| 1 | 0 | 0 | 0 | 0 | 0 | 0 | 0 | 0 | No multiframe |
| 2 | 0 | 0 | 0 | 0 | 0 | 0 | 0 | 0 | FAS (even frame) |
| 3 | 0 | 0 | 0 | 0 | 0 | 0 | 0 | 0 | |
| 4 | 0 | 0 | 0 | 0 | 0 | 0 | 0 | 1 | |
| 5 | 0 | 0 | 0 | 0 | 0 | 0 | 0 | 1 | |
| 6 | 0 | 0 | 0 | 0 | 0 | 0 | 0 | 0 | |
| 7 | 0 | 0 | 0 | 0 | 0 | 0 | 0 | 1 | |
| 8 | 0 | 0 | 0 | 0 | 0 | 0 | 0 | 1 | |
| 9 | 0 | 0 | 0 | 0 | 0 | 0 | 0 | 0 | BAS Code (neutral) |
| 10 | 0 | 0 | 0 | 0 | 0 | 0 | 0 | 0 | |
| 11 | 0 | 0 | 0 | 0 | 0 | 0 | 0 | 0 | |
| 12 | 0 | 0 | 0 | 0 | 0 | 0 | 0 | 0 | |
| 13 | 0 | 0 | 0 | 0 | 0 | 0 | 0 | 0 | |
| 14 | 0 | 0 | 0 | 0 | 0 | 0 | 0 | 0 | |
| 15 | 0 | 0 | 0 | 0 | 0 | 0 | 0 | 0 | |
| 16 | 0 | 0 | 0 | 0 | 0 | 0 | 0 | 0 | |
| 17 | 0 | 1 | 1 | 1 | 1 | 1 | 1 | 0 | HDLC Flag |
| 18 | 1 | 0 | 0 | 0 | 0 | 0 | 0 | 0 | UI Header |
| 19 | 0 | 1 | 1 | 0 | 1 | 0 | 0 | 1 | i |
| 20 | 0 | 1 | 0 | 1 | 0 | 1 | 0 | 0 | T |
| 21 | 0 | 1 | 1 | 0 | 1 | 1 | 1 | 1 | o |
| 22 | 0 | 1 | 1 | 0 | 1 | 1 | 1 | 0 | n |
| 23 | 0 | 1 | 1 | 0 | 0 | 1 | 0 | 1 | e |
| 24 | 0 | 0 | 1 | 0 | 0 | 0 | 0 | 0 | (sp) |
| 25 | 0 | 1 | 1 | 1 | 0 | 0 | 1 | 0 | r |
| 26 | 0 | 1 | 1 | 0 | 0 | 1 | 0 | 1 | e |
| 27 | 0 | 1 | 1 | 1 | 0 | 1 | 1 | 0 | v |
| 28 | 0 | 0 | 1 | 0 | 0 | 0 | 0 | 0 | (sp) |

*FIG. 4(a)*

| 29 | x8 | x7 | x6 | x5 | x5 | x3 | x2 | x1 | x |
|----|----|----|----|----|----|----|----|----|---|
| 30 | x8 | x7 | x6 | x5 | x5 | x3 | x2 | x1 | x |
| 31 | x8 | x7 | x6 | x5 | x5 | x3 | x2 | x1 | x |
| 32 | x8 | x7 | x6 | x5 | x5 | x3 | x2 | x1 | x |
| 33 | x8 | x7 | x6 | x5 | x5 | x3 | x2 | x1 | x |
| 34 | 0 | 0 | 1 | 0 | 1 | 1 | 1 | 0 | . |
| 35 | y8 | y7 | y6 | y5 | y4 | y3 | y2 | y1 | y |
| 36 | y8 | y7 | y6 | y5 | y4 | y3 | y2 | y1 | y |
| 37 | y8 | y7 | y6 | y5 | y4 | y3 | y2 | y1 | y |
| 38 | y8 | y7 | y6 | y5 | y4 | y3 | y2 | y1 | y |
| 39 | 0 | 0 | 1 | 0 | 1 | 1 | 1 | 0 | . |
| 40 | z8 | z7 | z6 | z5 | z4 | z3 | z2 | z1 | z |
| 41 | z8 | z7 | z6 | z5 | z4 | z3 | z2 | z1 | z |
| 42 | z8 | z7 | z6 | z5 | z4 | z3 | z2 | z1 | z |
| 43 | z8 | z7 | z6 | z5 | z4 | z3 | z2 | z1 | z |
| 44 | 0 | 0 | 1 | 0 | 0 | 0 | 0 | 0 | (sp) |
| 45 | 0 | 1 | 1 | 0 | 0 | 0 | 1 | 1 | c |
| 46 | 0 | 1 | 1 | 0 | 1 | 1 | 1 | 1 | o |
| 47 | 0 | 1 | 1 | 1 | 0 | 0 | 0 | 0 | p |
| 48 | 0 | 1 | 1 | 1 | 1 | 0 | 0 | 1 | y |
| 49 | 0 | 1 | 1 | 1 | 0 | 0 | 1 | 0 | r |
| 50 | 0 | 1 | 1 | 0 | 1 | 0 | 0 | 1 | i |
| 51 | 0 | 1 | 1 | 0 | 0 | 1 | 1 | 1 | g |
| 52 | 0 | 1 | 1 | 0 | 1 | 0 | 0 | 0 | h |
| 53 | 0 | 1 | 1 | 1 | 0 | 1 | 0 | 0 | t |
| 54 | 0 | 0 | 1 | 1 | 0 | 0 | 0 | 1 | 1 |
| 55 | 0 | 0 | 1 | 1 | 1 | 0 | 0 | 1 | 9 |
| 56 | 0 | 0 | 1 | 1 | 1 | 0 | 0 | 1 | 9 |
| 57 | 0 | 0 | 1 | 1 | 0 | 0 | 1 | 1 | 3 |

*FIG. 4(b)*

| | | | | | | | | | |
|---|---|---|---|---|---|---|---|---|---|
| 58 | 0 | 0 | 0 | 0 | 0 | 0 | 0 | 0 | (null) |
| 59 | 0 | 0 | 0 | 0 | 0 | 0 | 0 | 0 | (null) |
| 60 | 0 | 0 | 0 | 0 | 0 | 0 | 0 | 0 | (null) |
| 61 | 0 | 0 | 0 | 0 | 0 | 0 | 0 | 0 | (null) |
| 62 | 0 | 0 | 0 | 0 | 0 | 0 | 0 | 0 | (null) |
| 63 | 0 | 0 | 0 | 0 | 0 | 0 | 0 | 0 | (null) |
| 64 | 0 | 0 | 0 | 0 | 0 | 0 | 0 | 0 | (null) |
| 65 | 0 | 0 | 0 | 0 | 0 | 0 | 0 | 0 | (null) |
| 66 | 0 | 0 | 0 | 0 | 0 | 0 | 0 | 0 | (null) |
| 67 | 0 | 0 | 0 | 0 | 0 | 0 | 0 | 0 | (null) |
| 68 | 0 | 0 | 0 | 0 | 0 | 0 | 0 | 0 | CRC1 |
| 69 | 0 | 0 | 0 | 0 | 0 | 0 | 0 | 0 | CRC2 |
| 70 | 0 | 1 | 1 | 1 | 1 | 1 | 1 | 0 | HDLC Flag |
| 71 | 0 | 0 | 0 | 0 | 0 | 0 | 0 | 0 | (null) |
| 72 | 0 | 0 | 0 | 0 | 0 | 0 | 0 | 0 | (null) |
| 73 | 0 | 0 | 0 | 0 | 0 | 0 | 0 | 0 | (null) |
| 74 | 0 | 0 | 0 | 0 | 0 | 0 | 0 | 0 | (null) |
| 75 | 0 | 0 | 0 | 0 | 0 | 0 | 0 | 0 | (null) |
| 76 | 0 | 0 | 0 | 0 | 0 | 0 | 0 | 0 | (null) |
| 77 | 0 | 0 | 0 | 0 | 0 | 0 | 0 | 0 | (null) |
| 78 | 0 | 0 | 0 | 0 | 0 | 0 | 0 | 0 | (null) |
| 79 | 0 | 0 | 0 | 0 | 0 | 0 | 0 | 0 | (null) |
| 80 | 0 | 0 | 0 | 0 | 0 | 0 | 0 | 0 | (null) |

*FIG. 4(c)*

Odd Frame

Logical Channel or Bit Position

| Octet | 1 | 2 | 3 | 4 | 5 | 6 | 7 | 8 | |
|---|---|---|---|---|---|---|---|---|---|
| 1 | 0 | 0 | 0 | 0 | 0 | 0 | 0 | 0 | No multiframe |
| 2 | 0 | 0 | 0 | 0 | 0 | 0 | 0 | 1 | FAS (odd frame) |
| 3 | 0 | 0 | 0 | 0 | 0 | 0 | 0 | 0 | |
| 4 | 0 | 0 | 0 | 0 | 0 | 0 | 0 | 1 | |
| 5 | 0 | 0 | 0 | 0 | 0 | 0 | 0 | 1 | |
| 6 | 0 | 0 | 0 | 0 | 0 | 0 | 0 | 0 | |
| 7 | 0 | 0 | 0 | 0 | 0 | 0 | 0 | 1 | |
| 8 | 0 | 0 | 0 | 0 | 0 | 0 | 0 | 1 | |
| 9 | 0 | 0 | 0 | 0 | 0 | 0 | 0 | 0 | BAS Code (neutral) |
| 10 | 0 | 0 | 0 | 0 | 0 | 0 | 0 | 0 | |
| 11 | 0 | 0 | 0 | 0 | 0 | 0 | 0 | 0 | |
| 12 | 0 | 0 | 0 | 0 | 0 | 0 | 0 | 0 | |
| 13 | 0 | 0 | 0 | 0 | 0 | 0 | 0 | 0 | |
| 14 | 0 | 0 | 0 | 0 | 0 | 0 | 0 | 0 | |
| 15 | 0 | 0 | 0 | 0 | 0 | 0 | 0 | 0 | |
| 16 | 0 | 0 | 0 | 0 | 0 | 0 | 0 | 0 | |
| 17 | 0 | 1 | 1 | 1 | 1 | 1 | 1 | 0 | HDLC Flag |
| 18 | 1 | 0 | 0 | 0 | 0 | 0 | 0 | 0 | UI Header |
| 19 | 0 | 1 | 1 | 0 | 1 | 0 | 0 | 1 | i |
| 20 | 0 | 1 | 0 | 1 | 0 | 1 | 0 | 0 | T |
| 21 | 0 | 1 | 1 | 0 | 1 | 1 | 1 | 1 | o |
| 22 | 0 | 1 | 1 | 0 | 1 | 1 | 1 | 0 | n |
| 23 | 0 | 1 | 1 | 0 | 0 | 1 | 0 | 1 | e |
| 24 | 0 | 0 | 1 | 0 | 0 | 0 | 0 | 0 | (sp) |
| 25 | 0 | 1 | 1 | 1 | 0 | 0 | 1 | 0 | r |
| 26 | 0 | 1 | 1 | 0 | 0 | 1 | 0 | 1 | e |
| 27 | 0 | 1 | 1 | 1 | 0 | 1 | 1 | 0 | v |
| 28 | 0 | 0 | 1 | 0 | 0 | 0 | 0 | 0 | (sp) |

*FIG. 5(a)*

| | | | | | | | | | |
|---|---|---|---|---|---|---|---|---|---|
| 29 | x8 | x7 | x6 | x5 | x5 | x3 | x2 | x1 | x |
| 30 | x8 | x7 | x6 | x5 | x5 | x3 | x2 | x1 | x |
| 31 | x8 | x7 | x6 | x5 | x5 | x3 | x2 | x1 | x |
| 32 | x8 | x7 | x6 | x5 | x5 | x3 | x2 | x1 | x |
| 33 | x8 | x7 | x6 | x5 | x5 | x3 | x2 | x1 | x |
| 34 | 0 | 0 | 1 | 0 | 1 | 1 | 1 | 0 | . |
| 35 | y8 | y7 | y6 | y5 | y4 | y3 | y2 | y1 | y |
| 36 | y8 | y7 | y6 | y5 | y4 | y3 | y2 | y1 | y |
| 37 | y8 | y7 | y6 | y5 | y4 | y3 | y2 | y1 | y |
| 38 | y8 | y7 | y6 | y5 | y4 | y3 | y2 | y1 | y |
| 39 | 0 | 0 | 1 | 0 | 1 | 1 | 1 | 0 | . |
| 40 | z8 | z7 | z6 | z5 | z4 | z3 | z2 | z1 | z |
| 41 | z8 | z7 | z6 | z5 | z4 | z3 | z2 | z1 | z |
| 42 | z8 | z7 | z6 | z5 | z4 | z3 | z2 | z1 | z |
| 43 | z8 | z7 | z6 | z5 | z4 | z3 | z2 | z1 | z |
| 44 | 0 | 0 | 1 | 0 | 0 | 0 | 0 | 0 | (sp) |
| 45 | 0 | 1 | 1 | 0 | 0 | 0 | 1 | 1 | c |
| 46 | 0 | 1 | 1 | 0 | 1 | 1 | 1 | 1 | o |
| 47 | 0 | 1 | 1 | 1 | 0 | 0 | 0 | 0 | p |
| 48 | 0 | 1 | 1 | 1 | 1 | 0 | 0 | 1 | y |
| 49 | 0 | 1 | 1 | 1 | 0 | 0 | 1 | 0 | r |
| 50 | 0 | 1 | 1 | 0 | 1 | 0 | 0 | 1 | i |
| 51 | 0 | 1 | 1 | 0 | 0 | 1 | 1 | 1 | g |
| 52 | 0 | 1 | 1 | 0 | 1 | 0 | 0 | 0 | h |
| 53 | 0 | 1 | 1 | 1 | 0 | 1 | 0 | 0 | t |
| 54 | 0 | 0 | 1 | 1 | 0 | 0 | 0 | 1 | 1 |
| 55 | 0 | 0 | 1 | 1 | 1 | 0 | 0 | 1 | 9 |
| 56 | 0 | 0 | 1 | 1 | 1 | 0 | 0 | 1 | 9 |
| 57 | 0 | 0 | 1 | 1 | 0 | 0 | 1 | 1 | 3 |

FIG. 5(b)

| | | | | | | | | | |
|---|---|---|---|---|---|---|---|---|---|
| 58 | 0 | 0 | 0 | 0 | 0 | 0 | 0 | 0 | (null) |
| 59 | 0 | 0 | 0 | 0 | 0 | 0 | 0 | 0 | (null) |
| 60 | 0 | 0 | 0 | 0 | 0 | 0 | 0 | 0 | (null) |
| 61 | 0 | 0 | 0 | 0 | 0 | 0 | 0 | 0 | (null) |
| 62 | 0 | 0 | 0 | 0 | 0 | 0 | 0 | 0 | (null) |
| 63 | 0 | 0 | 0 | 0 | 0 | 0 | 0 | 0 | (null) |
| 64 | 0 | 0 | 0 | 0 | 0 | 0 | 0 | 0 | (null) |
| 65 | 0 | 0 | 0 | 0 | 0 | 0 | 0 | 0 | (null) |
| 66 | 0 | 0 | 0 | 0 | 0 | 0 | 0 | 0 | (null) |
| 67 | 0 | 0 | 0 | 0 | 0 | 0 | 0 | 0 | (null) |
| 68 | 0 | 0 | 0 | 0 | 0 | 0 | 0 | 0 | CRC1 |
| 69 | 0 | 0 | 0 | 0 | 0 | 0 | 0 | 0 | CRC2 |
| 70 | 0 | 1 | 1 | 1 | 1 | 1 | 1 | 0 | HDLC Flag |
| 71 | 0 | 0 | 0 | 0 | 0 | 0 | 0 | 0 | (null) |
| 72 | 0 | 0 | 0 | 0 | 0 | 0 | 0 | 0 | (null) |
| 73 | 0 | 0 | 0 | 0 | 0 | 0 | 0 | 0 | (null) |
| 74 | 0 | 0 | 0 | 0 | 0 | 0 | 0 | 0 | (null) |
| 75 | 0 | 0 | 0 | 0 | 0 | 0 | 0 | 0 | (null) |
| 76 | 0 | 0 | 0 | 0 | 0 | 0 | 0 | 0 | (null) |
| 77 | 0 | 0 | 0 | 0 | 0 | 0 | 0 | 0 | (null) |
| 78 | 0 | 0 | 0 | 0 | 0 | 0 | 0 | 0 | (null) |
| 79 | 0 | 0 | 0 | 0 | 0 | 0 | 0 | 0 | (null) |
| 80 | 0 | 0 | 0 | 0 | 0 | 0 | 0 | 0 | (null) |

*FIG. 5(c)*

Optional HDLC Header

```
                 Logical Channel or Bit Position
Octet       1    2    3    4    5    6    7    8
Generated by internal HDLC controller:
-           0    1    1    1    1    1    1    0    HDLC Flag
-           1    0    0    0    0    0    0    0    Address Octet 1
-           1    0    0    0    0    0    0    0    Address Octet 2
-           0    0    0    0    0    0    1    1    QMUX Control Field 1
                                                    (UI)
-           0    0    0    0    0    0    0    0    QMUX Control Field 2
                                                    (null)
-           0    0    0    0    0    0    0    0    (null)
-           0    0    0    0    0    0    0    0    (null)
-           0    0    0    0    0    0    0    0    (null)
-           0    0    0    0    0    0    0    0    (null)
```

*FIG. 6*

Even Frame

```
                   Logical Channel or Bit Position
Octet   1   2   3   4   5   6   7   8    (FAS and BAS in LC 5)
  1     0   0   0   0   0   0   0   1    No multiframe
  2     0   0   0   0   0   0   0   1    FAS (even frame)
  3     0   0   0   0   0   0   0   1
  4     0   0   0   0   1   0   0   1
  5     0   0   0   0   1   0   0   1
  6     0   0   0   0   0   0   0   1
  7     0   0   0   0   1   0   0   1
  8     0   0   0   0   1   0   0   1
  9     0   0   0   0   0   0   0   1    BAS Code (neutral)
 10     0   0   0   0   0   0   0   1
 11     0   0   0   0   0   0   0   1
 12     0   0   0   0   0   0   0   1
 13     0   0   0   0   0   0   0   1
 14     0   0   0   0   0   0   0   1
 15     0   0   0   0   0   0   0   1
 16     0   0   0   0   0   0   0   1
 17     0   1   1   1   1   1   1   1    HDLC Flag
 18     0   1   0   0   0   0   0   1    UI Header
 19     0   0   0   1   1   0   1   1    i
 20     0   0   1   0   1   0   1   1    T
 21     0   1   0   0   0   1   1   1    o
 22     0   1   1   1   1   0   1   1    n
 23     1   0   1   1   1   0   0   1    e
 24     1   1   0   0   1   0   1   1
 25     0   0   1   0   0   0   0   1    (sp)
 26     0   0   1   1   1   0   0   1    r
 27     1   0   0   1   1   0   0   1    e
 28     1   0   1   0   1   1   1   1    v
 29     0   1   1   0   0   0   1   1    (sp)
 30     0   0   0   0   0   x8  x7  1    x
 31     x6  x5  x4  x3  x2  x1  x8  1    x
 32     x7  x6  x5  x4  x3  x2  x1  1
 33     x8  x7  x6  x5  x4  x3  x2  1    x
```

*FIG. 7(a)*

| | | | | | | | | | |
|---|---|---|---|---|---|---|---|---|---|
| 34 | x1 | x8 | x7 | x6 | x5 | x4 | x3 | 1 | x |
| 35 | x2 | x1 | x8 | x6 | x6 | x5 | x4 | 1 | x |
| 36 | x3 | x2 | x1 | 0 | 0 | 1 | 0 | 1 | . |
| 37 | 1 | 1 | 1 | 0 | y8 | y7 | y6 | 1 | y |
| 38 | y5 | y4 | y3 | y2 | y1 | y8 | y7 | 1 | y |
| 39 | y6 | y5 | y4 | y3 | y2 | y1 | y8 | 1 | y |
| 40 | y7 | y6 | y5 | y4 | y3 | y2 | y1 | 1 | |
| 41 | y8 | y7 | y6 | y5 | y4 | y3 | y2 | 1 | y |
| 42 | y1 | 0 | 0 | 1 | 0 | 1 | 1 | 1 | . |
| 43 | 1 | 0 | z8 | z7 | z6 | z5 | z4 | 1 | z |
| 44 | z3 | z2 | z1 | z8 | z7 | z6 | z5 | 1 | z |
| 45 | z4 | z3 | z2 | z1 | z8 | z7 | z6 | 1 | z |
| 46 | z5 | z4 | z3 | z2 | z1 | z8 | z7 | 1 | z |
| 47 | z6 | z5 | z4 | z3 | z2 | z1 | 0 | 1 | (sp) |
| 48 | 0 | 1 | 0 | 0 | 0 | 0 | 0 | 1 | |
| 49 | 0 | 1 | 1 | 0 | 0 | 0 | 1 | 1 | c |
| 50 | 1 | 0 | 1 | 1 | 0 | 1 | 1 | 1 | o |
| 51 | 1 | 1 | 0 | 1 | 1 | 1 | 0 | 1 | p |
| 52 | 0 | 0 | 0 | 0 | 1 | 1 | 1 | 1 | y |
| 53 | 1 | 0 | 0 | 1 | 0 | 1 | 1 | 1 | r |
| 54 | 1 | 0 | 0 | 1 | 0 | 0 | 1 | 1 | i |
| 55 | 1 | 0 | 1 | 0 | 0 | 1 | 0 | 1 | g |
| 56 | 1 | 1 | 0 | 0 | 1 | 1 | 1 | 1 | |

*FIG. 7(b)*

| | | | | | | | | | |
|---|---|---|---|---|---|---|---|---|---|
| 57 | 0 | 1 | 1 | 0 | 1 | 0 | 0 | 1 | h |
| 58 | 0 | 0 | 1 | 1 | 1 | 0 | 1 | 1 | t |
| 59 | 0 | 0 | 0 | 0 | 1 | 1 | 0 | 1 | 1 |
| 60 | 0 | 0 | 1 | 0 | 0 | 1 | 1 | 1 | 9 |
| 61 | 1 | 0 | 0 | 1 | 0 | 0 | 1 | 1 | 9 |
| 62 | 1 | 1 | 0 | 0 | 1 | 0 | 0 | 1 | 3 |
| 63 | 1 | 1 | 0 | 0 | 1 | 1 | 0 | 1 | (null) |
| 64 | 0 | 0 | 0 | 0 | 0 | 0 | 0 | 1 | |
| 65 | 0 | 0 | 0 | 0 | 0 | 0 | 0 | 1 | (null) |
| 66 | 0 | 0 | 0 | 0 | 0 | 0 | 0 | 1 | (null) |
| 67 | 0 | 0 | 0 | 0 | 0 | 0 | 0 | 1 | (null) |
| 68 | 0 | 0 | 0 | 0 | 0 | 0 | 0 | 1 | (null) |
| 69 | 0 | 0 | 0 | 0 | 0 | 0 | 0 | 1 | (null) |
| 70 | 0 | 0 | 0 | 0 | 0 | 0 | 0 | 1 | (null) |
| 71 | 0 | 0 | 0 | 0 | 0 | 0 | 0 | 1 | (null) |
| 72 | 0 | 0 | 0 | 0 | 0 | 0 | 0 | 1 | |
| 73 | 0 | 0 | 0 | 0 | 0 | 0 | 0 | 1 | (null) |
| 74 | 0 | 0 | 0 | 0 | 0 | 0 | 0 | 1 | (null) |
| 75 | 0 | 0 | 0 | 0 | 0 | 0 | 0 | 1 | (null) |
| 76 | 0 | 0 | 0 | 0 | 0 | 0 | 0 | 1 | (null) |
| 77 | 0 | 0 | 0 | 0 | 0 | 0 | 0 | 1 | CRC1 |
| 78 | 0 | 0 | 0 | 0 | 0 | 0 | 0 | 1 | CRC2 |
| 79 | 0 | 0 | 0 | 0 | 0 | 0 | 0 | 1 | HDLC Flag |
| 80 | 1 | 1 | 1 | 1 | 1 | 1 | 0 | 1 | |

*FIG. 7(c)*

Odd Frame

| Octet | \multicolumn{8}{c|}{Logical Channel or Bit Position} | (FAS and BAS in LC 5) |

| Octet | 1 | 2 | 3 | 4 | 5 | 6 | 7 | 8 | |
|---|---|---|---|---|---|---|---|---|---|
| 1 | 0 | 0 | 0 | 0 | 0 | 0 | 0 | 1 | No multiframe |
| 2 | 0 | 0 | 0 | 0 | 0 | 0 | 0 | 1 | FAS (even frame) |
| 3 | 0 | 0 | 0 | 0 | 0 | 0 | 0 | 1 | |
| 4 | 0 | 0 | 0 | 0 | 1 | 0 | 0 | 1 | |
| 5 | 0 | 0 | 0 | 0 | 1 | 0 | 0 | 1 | |
| 6 | 0 | 0 | 0 | 0 | 0 | 0 | 0 | 1 | |
| 7 | 0 | 0 | 0 | 0 | 1 | 0 | 0 | 1 | |
| 8 | 0 | 0 | 0 | 0 | 1 | 0 | 0 | 1 | |
| 9 | 0 | 0 | 0 | 0 | 0 | 0 | 0 | 1 | BAS Code (neutral) |
| 10 | 0 | 0 | 0 | 0 | 0 | 0 | 0 | 1 | |
| 11 | 0 | 0 | 0 | 0 | 0 | 0 | 0 | 1 | |
| 12 | 0 | 0 | 0 | 0 | 0 | 0 | 0 | 1 | |
| 13 | 0 | 0 | 0 | 0 | 0 | 0 | 0 | 1 | |
| 14 | 0 | 0 | 0 | 0 | 0 | 0 | 0 | 1 | |
| 15 | 0 | 0 | 0 | 0 | 0 | 0 | 0 | 1 | |
| 16 | 0 | 0 | 0 | 0 | 0 | 0 | 0 | 1 | |
| 17 | 0 | 1 | 1 | 1 | 1 | 1 | 1 | 1 | HDLC Flag |
| 18 | 0 | 1 | 0 | 0 | 0 | 0 | 0 | 1 | UI Header |
| 19 | 0 | 0 | 0 | 1 | 1 | 0 | 1 | 1 | i |
| 20 | 0 | 0 | 1 | 0 | 1 | 0 | 1 | 1 | T |
| 21 | 0 | 1 | 0 | 0 | 0 | 1 | 1 | 1 | o |
| 22 | 0 | 1 | 1 | 1 | 1 | 0 | 1 | 1 | n |
| 23 | 1 | 0 | 1 | 1 | 1 | 0 | 0 | 1 | e |
| 24 | 1 | 1 | 0 | 0 | 1 | 0 | 1 | 1 | |
| 25 | 0 | 0 | 1 | 0 | 0 | 0 | 0 | 1 | (sp) |
| 26 | 0 | 0 | 1 | 1 | 1 | 0 | 0 | 1 | r |
| 27 | 1 | 0 | 0 | 1 | 1 | 0 | 0 | 1 | e |
| 28 | 1 | 0 | 1 | 0 | 1 | 1 | 1 | 1 | v |
| 29 | 0 | 1 | 1 | 0 | 0 | 0 | 1 | 1 | (sp) |
| 30 | 0 | 0 | 0 | 0 | 0 | x8 | x7 | 1 | x |
| 31 | x6 | x5 | x4 | x3 | x2 | x1 | x8 | 1 | x |
| 32 | x7 | x6 | x5 | x4 | x3 | x2 | x1 | 1 | |

*FIG. 8(a)*

| | | | | | | | | | |
|---|---|---|---|---|---|---|---|---|---|
| 33 | x8 | x7 | x6 | x5 | x4 | x3 | x2 | 1 | x |
| 34 | x1 | x8 | x7 | x6 | x5 | x4 | x3 | 1 | x |
| 35 | x2 | x1 | x8 | x6 | x6 | x5 | x4 | 1 | x |
| 36 | x3 | x2 | x1 | 0 | 0 | 1 | 0 | 1 | . |
| 37 | 1 | 1 | 1 | 0 | y8 | y7 | y6 | 1 | y |
| 38 | y5 | y4 | y3 | y2 | y1 | y8 | y7 | 1 | y |
| 39 | y6 | y5 | y4 | y3 | y2 | y1 | y8 | 1 | y |
| 40 | y7 | y6 | y5 | y4 | y3 | y2 | y1 | 1 | |
| 41 | y8 | y7 | y6 | y5 | y4 | y3 | y2 | 1 | y |
| 42 | y1 | 0 | 0 | 1 | 0 | 1 | 1 | 1 | . |
| 43 | 1 | 0 | z8 | z7 | z6 | z5 | z4 | 1 | z |
| 44 | z3 | z2 | z1 | z8 | z7 | z6 | z5 | 1 | z |
| 45 | z4 | z3 | z2 | z1 | z8 | z7 | z6 | 1 | z |
| 46 | z5 | z4 | z3 | z2 | z1 | z8 | z7 | 1 | z |
| 47 | z6 | z5 | z4 | z3 | z2 | z1 | 0 | 1 | (sp) |
| 48 | 0 | 1 | 0 | 0 | 0 | 0 | 0 | 1 | |
| 49 | 0 | 1 | 1 | 0 | 0 | 0 | 1 | 1 | c |
| 50 | 1 | 0 | 1 | 1 | 0 | 1 | 1 | 1 | o |
| 51 | 1 | 1 | 0 | 1 | 1 | 1 | 0 | 1 | p |
| 52 | 0 | 0 | 0 | 0 | 1 | 1 | 1 | 1 | y |
| 53 | 1 | 0 | 0 | 1 | 0 | 1 | 1 | 1 | r |
| 54 | 1 | 0 | 0 | 1 | 0 | 0 | 1 | 1 | i |
| 55 | 1 | 0 | 1 | 0 | 0 | 1 | 0 | 1 | g |
| 56 | 1 | 1 | 0 | 0 | 1 | 1 | 1 | 1 | |
| 57 | 0 | 1 | 1 | 0 | 1 | 0 | 0 | 1 | h |
| 58 | 0 | 0 | 1 | 1 | 1 | 0 | 1 | 1 | t |
| 59 | 0 | 0 | 0 | 0 | 1 | 1 | 0 | 1 | 1 |
| 60 | 0 | 0 | 1 | 0 | 0 | 1 | 1 | 1 | 9 |
| 61 | 1 | 0 | 0 | 1 | 0 | 0 | 1 | 1 | 9 |
| 62 | 1 | 1 | 0 | 0 | 1 | 0 | 0 | 1 | 3 |
| 63 | 1 | 1 | 0 | 0 | 1 | 1 | 0 | 1 | (null) |
| 64 | 0 | 0 | 0 | 0 | 0 | 0 | 0 | 1 | |

*FIG. 8(b)*

| 65 | 0 | 0 | 0 | 0 | 0 | 0 | 0 | 1 | (null) |
|----|---|---|---|---|---|---|---|---|--------|
| 66 | 0 | 0 | 0 | 0 | 0 | 0 | 0 | 1 | (null) |
| 67 | 0 | 0 | 0 | 0 | 0 | 0 | 0 | 1 | (null) |
| 68 | 0 | 0 | 0 | 0 | 0 | 0 | 0 | 1 | (null) |
| 69 | 0 | 0 | 0 | 0 | 0 | 0 | 0 | 1 | (null) |
| 70 | 0 | 0 | 0 | 0 | 0 | 0 | 0 | 1 | (null) |
| 71 | 0 | 0 | 0 | 0 | 0 | 0 | 0 | 1 | (null) |
| 72 | 0 | 0 | 0 | 0 | 0 | 0 | 0 | 1 |        |
| 73 | 0 | 0 | 0 | 0 | 0 | 0 | 0 | 1 | (null) |
| 74 | 0 | 0 | 0 | 0 | 0 | 0 | 0 | 1 | (null) |
| 75 | 0 | 0 | 0 | 0 | 0 | 0 | 0 | 1 | (null) |
| 76 | 0 | 0 | 0 | 0 | 0 | 0 | 0 | 1 | (null) |
| 77 | 0 | 0 | 0 | 0 | 0 | 0 | 0 | 1 | CRC1 |
| 78 | 0 | 0 | 0 | 0 | 0 | 0 | 0 | 1 | CRC2 |
| 79 | 0 | 0 | 0 | 0 | 0 | 0 | 0 | 1 | HDLC Flag |
| 80 | 1 | 1 | 1 | 1 | 1 | 1 | 0 | 1 |   |

*FIG. 8(c)*

| Octet | 1 | 2 | 3 | 4 | 5 | 6 | 7 | 8 | |
|---|---|---|---|---|---|---|---|---|---|
| — | 0 | 1 | 1 | 1 | 1 | 1 | 1 | 1 | HDLC Flag |
| — | 0 | 1 | 0 | 0 | 0 | 0 | 0 | 1 | Address Octet 1 |
| — | 0 | 0 | 1 | 0 | 0 | 0 | 0 | 1 | Address Octet 2 |
| — | 0 | 0 | 0 | 0 | 0 | 0 | 0 | 1 | QMUX Control Field 1 (UI) |
| — | 0 | 0 | 1 | 1 | 0 | 0 | 0 | 1 | QMUX Control Field 2 (null) |
| — | 0 | 0 | 0 | 0 | 0 | 0 | 0 | 1 | (null) |
| — | 0 | 0 | 0 | 0 | 0 | 0 | 0 | 1 | (null) |
| — | 0 | 0 | 0 | 0 | 0 | 0 | 0 | 1 | |

*FIG. 9* iTone Company Registration

| Company | iTone Company Number |
|---|---|
| Intel | 00001 |
| VTel | 00002 | iTone Product Registration

| Company | iTone Company Number |
|---|---|
| Intel Video Conferencing (XXXXXXXX) | 0001 |
| Intel Data Conferencing (XXXXX) | 0002 |
| Vtel Video Conferencing | 0003 | iTone Registration

| Company | Product | Shipping Version | iTone Number |
|---|---|---|---|
| Intel | Andrew VC | 1 | 00001.0001.0000 |
| Intel | Miata | 1 | 00001.0002.0000 |
| Intel | Cyborg VC | 1 | 00001.0003.0000 |
| Intel | Cyborg VC + | 1 | 00001.0004.0000 |
| VTel | VTEL −1 | 1 | 00002.0001.0000 |
| VTel | VTEL −2 | 1 | 00002.0002.0000 |
| VTel | VTEL −3 | 1 | 00002.0003.0000 |

*FIG. 10*

An example of a typical conference endpoint using ISDN

Multi-standard Endpoint, such as a Personal Computer that is compliant to the Personal Conferencing Specification

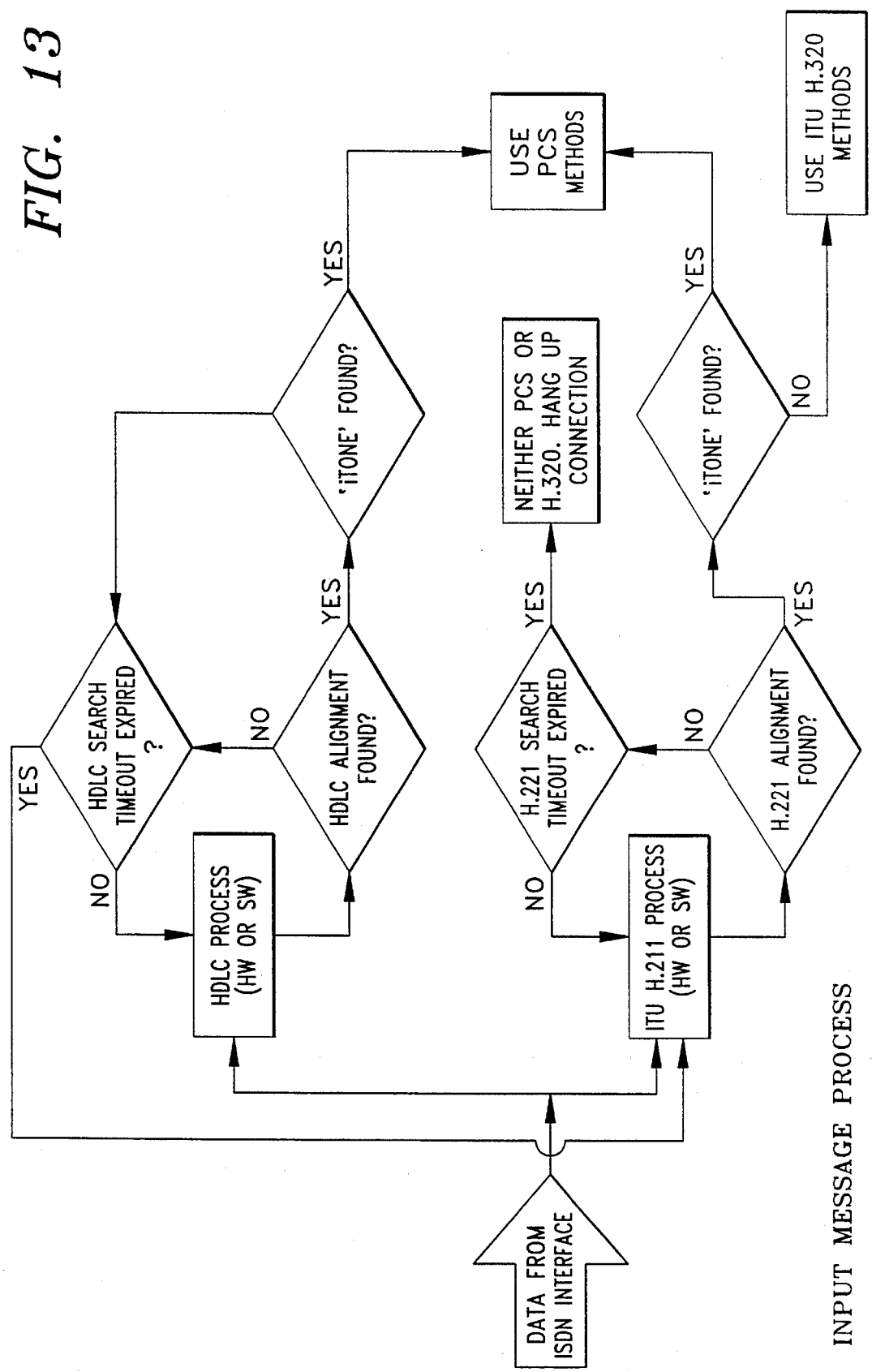

AUTOMATIC IDENTIFICATION FOR DIGITAL CONFERENCING

BACKGROUND OF THE INVENTION

In digital conferencing, a variety of different formats are used for data transmission. Some formats are designed in accordance with international standards, whereas others are designed to comply with particular application specifications for use in specialized markets as agreed to by groups of manufacturers that are suppliers to those markets. For example, Intel Corporation has conferred with other computer equipment manufacturers to develop a Personal Conferencing Specification (PCS) that is an especially useful format for systems connecting personal computers for audio/video conferencing and is becoming a manufacturer's "standard." PCS is intended to be used on the Integrated Services Digital Network (ISDN). The ISDN is also used by equipment that is designed to comply with the international standard of the International Telephony Union (ITU). This ITU standard is formally referred to as the "H.320 standard" which is composed of three major sections: (1) the audio standard (G.728); (2) the video standard (H.261); and the audio/video connection standard for an ISDN connection (H.221).

The PCS and H.320 standards are not compatible. Equipment designed specifically for rise with PCS will not communicate with equipment designed specifically for use with H.320. It is expected that eventually equipment will become available that will operate in accordance with either mode. It is further expected that the preferred mode will be PCS.

FIG. 1 shows a matrix of possible equipment configurations and the expected choices (within the boxes) for the various combinations of equipment at two remote stations. As depicted, whenever the capabilities of both stations' equipment allow for it, the choice mode is to run in the PCS mode. In order to accomplish this it is necessary for the equipment at each station to communicate its capabilities to the equipment at the other station. Applicant has developed a novel technique called "iTONE" for allowing digital transmitting equipment to present itself in a "friendly way" to both PCS and H.320 terminals over the ISDN.

As is well-known to those skilled in the art, the H.320 format uses a "framing" technique for transmission of data. A typical frame contains eighty octets of bits, including an initial frame alignment sequence (FAS) and a bit allocation sequence (BAS). The PCS format, on the other hand, employs a well-known protocol picked many years ago from the IBM SDLC (Synchronous Data Link Control) which uses an HDLC (Highlevel Data Link Control) "flag" to indicate the starting and stopping of a message. These two formats are not normally compatible, but Applicant has discovered an approach which allows a terminal to send out a special identification signal (iTONE) that will identify the terminal and its capabilities equally well to either PCS or H.320 receiving equipment.

SUMMARY OF THE INVENTION

A digital identification signal ("iTONE"), comprising a serial bit stream of zeros and ones, is transmitted over a digital transmission network. The signal is formatted and transmitted as a "framed" signal, but is also readable by equipment that is designed to receive "flagged" data. In other words, iTONE casts a flagged message in a framed format so that equipment designed for either format can receive and decode the identification message and adjust its receiving mode accordingly. Each terminal is therefore able to determine if the other terminal is one with which it can accomplish full communication. Once this determination is made, then the preferred format is automatically chosen (e.g. PCS for audio/video conferencing) and full communication is implemented.

BRIEF DESCRIPTION OF THE DRAWING

FIG. 1 depicts Applicant's preferred prioritization scheme for choice of system operating mode.

FIG. 2 shows the iTONE bit sequences and their corresponding HDLC interpretations over the ISDN.

FIG. 3 gives the iTONE sequences and their corresponding HDLC interpretations over the PSTN.

FIGS. 4(a), (b), and (c) show the even blocks of the iTONE submultiframe for receiving 64 kbits/sec iTONE at the HDLC endpoint.

FIGS. 5(a), (b), and (c) show the odd blocks of the iTONE submultiframe for receiving 64 kbits/sec iTONE at the HDLC endpoint.

FIG. 6 shows an optional HDLC header for a 64 kbit/sec connection.

FIGS. 7(a), (b), and (c) give the even blocks of the iTONE submultiframe for receiving 56 kbits/sec iTONE at the HDLC endpoint.

FIGS. 8(a), (b), and (c) give the odd blocks of the iTONE submultiframe for receiving 56 kbits/sec iTONE at the HDLC endpoint.

FIG. 9 shows an optional HDLC header for a 56 kbit/sec connection.

FIG. 10 depicts a preferred iTONE numbering scheme for company, product and version.

FIG. 13 is a flow chart showing the decision-making process for implementing the instant invention.

DETAILED DESCRIPTION

Figure 11:
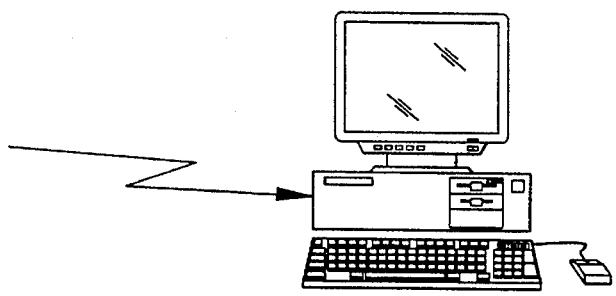
FIG. 11 shows a typical videoconference station.

This detailed description gives Applicant's preferred embodiment for implementation of iTONE on the ISDN for the H.221 framing structure of the ITU H.320 communications standard, in conjunction with Intel's new PCS industry standard employing HDLC flags in a self-synchronous serial protocol. What differentiates iTONE from other identification methods and handshakes is not the concept of exchanging capabilities information (which is already well-known), but the specific details of the signal, which looks like (and is) an H.221-compliant data stream from one perspective, while also functioning as an HDLC (PCS) identification string from another perspective. In other words, the data stream is arranged to be read either horizontally (by HDLC) or vertically (by H.221) at the same time!

The specific details of the iTONE concept are as follows:

A conferencing end point sends the iTONE after the physical layer connection (the switched circuit) is made.

In the case of ISDN, the connection status is given through the D channel. It is preferred that the data conferencing products send the iTONE (consisting of an even frame and an odd frame) six times.

In the case of data modems over the PSTN, the modem returns a ready signal. It is preferred that the data conferencing products send the iTONE (consisting of an even frame and an odd frame) twice to minimize the startup latency.

In the case of PSTN end points interworking with ISDN end points, the call type is indicated through the D channel to the ISDN end point. If the ISDN end point answers the call, it receives the voice-grade indication. If the ISDN end point originates the call, the only type of call the network will allow to the POTS end point is a voice-grade call; requests for other types of calls will be rejected. This allows the ISDN set to be ready to switch from PCM voice to PCM modulated data, analogous to a POTS-to-POTS modem call.

From the perspective of an H.320-complaint terminal, iTONE uses the H.221 Neutral BAS code. The intent of using the Neutral BAS code is that, other than the Frame Alignment Signal (FAS), no other information is used by the H.320-compliant terminal.

Each product and product version has a specific iTONE number assigned to it. An industry group will assume this responsibility. Uniqueness and integrity are by design.

The iTONE numbering is rich enough to let new releases determine what levels of interoperability exist within product releases and across product lines. This includes general knowledge about the particular audio, video, and data conferencing capabilities. Particular knowledge, such as coding parameters or conference protocol variables are not considered within the scope of iTONE.

The iTONE bit sequence is constructed to allow for interoperability between H.320 end points and HDLC end points. The purpose of this interoperability is to allow future H.320 end points to detect the iTONE through a software upgrade.

A data conference device detects the iTONE after the physical connection is made. In the case of ISDN, if the other end point is sending the iTONE, it will receive six iTONE sequences. Because the iTONE comprises an embedded HDLC message, a HDLC receiver would see the sequence depicted in FIG. 2.

A data modem over the PSTN will receive two iTONE sequences. Because the iTONE consists of an embedded HDLC message, a HDLC receiver would see the sequence depicted in FIG. 3.

The iTONE string is terminated by ASCII null characters. This is helpful in sparsing the string up to the control layers because it looks like a normal C-string.

When it detects the iTONE, the receiving end point may immediately respond with iTONE acknowledgement. This acknowledgment uses the UI acknowledgment specified in LAPM. Receipt of the UI acknowledgment by the iTONE transmitter suspends further transmission of the iTONE sequence, though an iTONE transmission already in progress will be completed and acknowledged by the receiver.

An ISDN-based (e.g., H.320-compliant (non-PCS)) data conferencing end point does not detect the iTONE. It may, however, recover the frame alignment signal (FAS) from the iTONE bit sequence. If the response to the iTONE (described below) has not been received one second from the time the fifth iTONE pair has been transmitted, the H.320 equipment will assume that the other end is not Intel compatible, and H.320 should be the mode of operation. In the interim period between the transmission of the tenth iTONE sequence and the one-second interval, the H.320 equipment may continue to send the iTONE sequence or fall back to sending H.221 neutral frames.

A POTS data modem conferencing end point may not detect the iTONE in a meaningful way. If the response to the iTONE (described below) has not been received one second from the time the second iTONE has been transmitted, the Intel equipment should assume that the other end is not compatible. In the interim period between the transmission of the second iTONE sequence and the one second interval, the transmitting equipment continuously sends HDLC flags to mark the channel as idle.

When receiving 56 kbit/sec data at the 64 kbit/sec H.320 end point, logical channel 8 is filled to all ones by the receiver. A switched 56 kbit/sec telephone switch data interface will recognize that only the seven msb's are relevant. The Sw56 interface will require two samples to reconstruct the 8-bit data octet which it then passes to the HDLC layer. The HDLC does not know (or care) that the octets were subdivided for physical transport to the other end. The net effect of the Sw56 and 64 kbit/sec is that over eighty 8 kHz samples, the Sw56 has only 7/8, or 70 octets of valid HDLC data, while 64 kbit/sec has the full 80 octets of the H.221 frame. The least common denominator between Sw56 and 64 is a 80-octet message (including all framing) that is sent across the network.

When receiving 64 kbit/sec data at the 56 kbit/s H.320 end point, the 64 kbit/sec end point fills logical channel 8 with ones. The 56 kbit/sec end point will ignore logical channel 8 since it may have been affected by the network. The network still presents 8 bits per octet, but only the 7 msb's are considered valid.

When receiving 64 kbit/sec iTONE at the HDLC end point, extraneous HDLC messages can be received that are not iTONE. These are considered nonsense and are ignored. As seen by an H.320 end point, the HDLC-based end points will transmit extraneous data at the beginning of the data exchange. This data is ignored since it does not match the H.320 FAS. The even and odd blocks of the iTONE sub-multiframes are depicted in FIGS. 4(a), (b), and (c), and 5(a), (b), and (c) respectively.

The transmitter may optionally include a HDLC header before sending the iTONE sequence as depicted in FIG. 6. This is useful when the transmitter uses HDLC hardware which would be difficult to remove from the transmit path. The optional header is sent only prior to the first iTONE even frame since it is not required in subsequent iTONE frames. The optional header is eight octets long for a 64 kbit/sec connection.

When receiving 56 kbit/sec iTONE at the HDLC end point, the HDLC transmitter send the shorter iTONE sequence to match the reception pattern of the data described previously and as depicted in FIGS. 7(a), (b), and (c) and 8(a), (b), and (c). Both the HDLC and H.320 receiver are indicated in the figures. The H.320 receiver assumes that logical channel 8 is all ones. The HDLC transmitter is configured so that bits wrap around the modulo-7 constraint of the 56 kbit/s connection.

The transmitter may optionally include a HDLC header before sending the iTONE sequence as depicted in FIG. 9. This is useful when the transmitter uses HDLC hardware which would be difficult to remove from the transmit path. The optional header is sent only prior to the first iTONE even frame since it is not required in subsequent iTONE frames. The optional header is seven octets long for a 56 kbit/sec connection.

When receiving iTONE at a POTS modem end point, or ISDN terminal (in modem emulation) end point, the modem-based (i.e., modem-emulation-based) end points will receive the ASCII iTONE string after the modem has demodulated the signal. It will receive the same string as the 64 kbit/sec H.320 end point.

If a HDLC hardware-assist is used for transmission, special attention should be paid to it proper use. If used in a bit-transparent mode (i.e., directly driving the line without the HDLC filing), the iTONE bit pattern should be used as discussed above. If the bit-filling is active, the HDLC hardware should be used to generate both the flags and CRC. Otherwise, the HDLC hardware will see the flag defined within the iTONE pattern and fill a zero in it to keep it transparent; the result will be an iTONE pattern shifted by a bit for each flag.

The iTONE numbering plan uses ASCII decimal digits 0 through 9 (0×30 through 0×39) separated by ASCII decimal points (0×2E) as follows: xxxxx.yyyy.zzzz which corresponds to company.product.version as depicted in FIG. 10.

Figure 12:
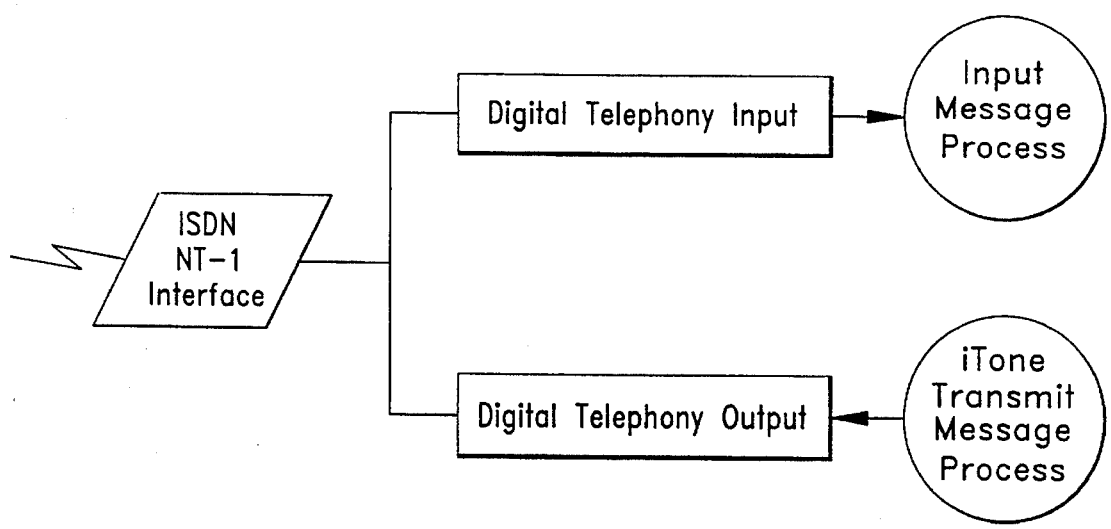
FIG. 12 shows a typical PC to ISDN interface suitable for implementing the instant invention.

FIG. 11 shows a typical PC station suitable for implementing the instant invention. FIG. 12 depicts how the PC of FIG. 11 interacts with the ISDN. The input and transmit processing shown is done within the PC.

FIG. 13 is a flow chart depicting the decision making process of an implementation of the instant invention. This process can be relatively easily implemented on particular PC equipment by a person skilled in the art of programming.

The preferred embodiments discussed herein are given by way of example, but are not intended to limit the scope of Applicant's invention which is defined by the appended claims and their fair equivalents.

What is claimed is:

1. For use in a digital communication system, including a digital network with a plurality of communication terminals, a method for characterizing a specific terminal's message format capabilities comprising the steps of:

(A) sending from said specific terminal a framed format identification message; and (B) including within said framed format identification message a corresponding flagged format identification message, wherein said framed format comprises the ITU H.320 standard, and said flagged format comprises a PCS format including the use of HDLC flags.

2. In a digital communication system, including a digital network with a plurality of communication terminals, apparatus for characterizing a specific terminal's message format capabilities comprising:

(A) means for sending from said specific terminal a framed format identification message; and (B) means for including within said framed format identification message a corresponding flagged format identification message, wherein said framed format comprises the ITU H.320 standard, and said flagged format comprises a PCS format including the use of HDLC flags.

* * * * *

UNITED STATES PATENT AND TRADEMARK OFFICE
CERTIFICATE OF CORRECTION

PATENT NO. : 5,600,684
DATED : February 4, 1997
INVENTOR(S) : Andrew Kuzma

It is certified that error appears in the above-indentified patent and that said Letters Patent is hereby corrected as shown below:

Title Page, Assignee: insert --Intel Corporation, Santa Clara, Calif.--.

Signed and Sealed this

Twenty-eighth Day of October, 1997

Attest:

BRUCE LEHMAN

Attesting Officer

Commissioner of Patents and Trademarks